(No Model.)
J. KRITCH.
AXLE BOX.
No. 270,903. Patented Jan. 23, 1883.
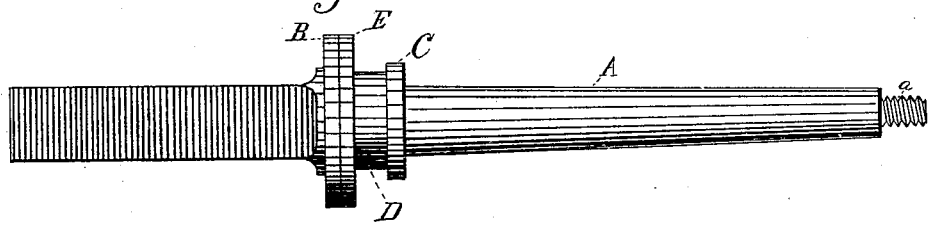
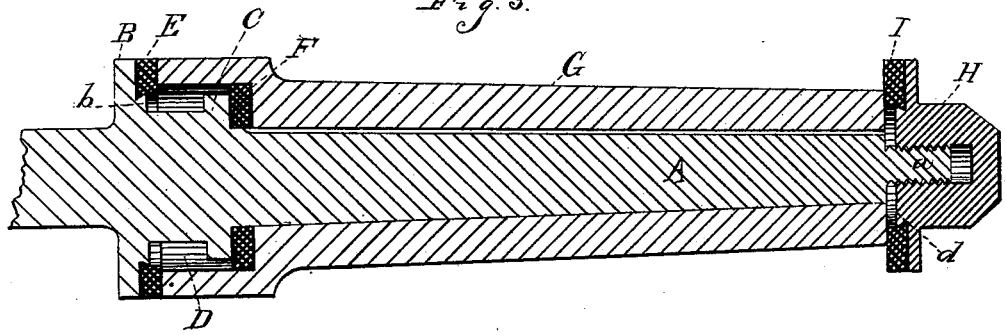
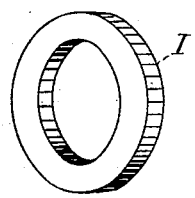 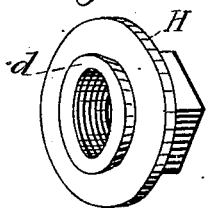
WITNESSES
C. H. Dorer
W. E. Connelly
Jacob Kritch INVENTOR
By Leggett & Leggett
ATTORNEYS
N. PETERS. Photo-Lithographer. Washington, D. C.

UNITED STATES PATENT OFFICE.

JACOB KRITCH, OF CLEVELAND, OHIO.

AXLE-BOX.

SPECIFICATION forming part of Letters Patent No. 270,903, dated January 23, 1883.

Application filed June 22, 1882. (No model.)

*To all whom it may concern:*

Be it known that I, JACOB KRITCH, of Cleveland, in the county of Cuyahoga and State of Ohio, have invented certain new and useful Improvements in Vehicle-Axles; and I do hereby declare the following to be a full, clear, and exact description of the invention, such as will enable others skilled in the art to which it pertains to make and use the same.

My invention relates to axles for vehicles; and it consists in the peculiar construction of the same, as will be hereinafter fully set forth and claimed.

In the drawings, Figure 1 is a view in elevation of my improved axle with bushing removed. Fig. 2 is a view in elevation of my bushing. Fig. 3 is a longitudinal vertical section, taken through the axle and bushing, with nut attached. Fig. 4 is an isometric view of my improved axle-nut, and Fig. 5 is an isometric view of my improved nut-washer.

A is an axle-journal the outer end of which is provided with a screw-thread, $a$. The inner end of the journal A is provided with two annular flanges, B and C, said flanges being formed a short distance apart, thus leaving a space or chamber, D, between them. (See Figs. 1 and 3.) The flange B is formed larger in diameter than the flange C, and is provided on its inner face with an annular projection, $b$. The periphery of the said projection may be formed with a sharp outer edge, as shown in Fig. 3, which acts, when the washer E is slipped over it, to retain said washer in place on the inner face of the flange B. The function of the washer E is to act as a packing between the end of the bushing G and the inner face of the flange B. (See Fig. 3.) F is another washer, which rests between the outer face of the flange C and the inner end of the cup-shaped recess on the end of the bushing G. Thus it will be seen that a washer is provided on both sides of the chamber D, so that any dust or dirt that might work in through the end of the bushing and the flange B will be collected in the chamber D and prevented from passing any farther by the washer F. I prefer to make these washers of unusual width, so they present a greater surface, and consequently will wear longer. The flange C is formed somewhat smaller in diameter than the interior circumference of the cup-shaped recess on the end of the bushing G. This construction prevents the metal from coming in contact, and thus obviates any grinding or rattling of the parts.

H is my improved nut, which is provided on its inner face with an annular projection, $d$, the periphery of said projection being inclined toward the face of the nut H in such a manner as to provide a sharp outer edge, which acts to retain the washer I in place on the said nut and allow of its being removed with the nut when it is desired to oil the axle or remove the wheel.

What I claim is—

1. In a vehicle-axle, the combination, with the axle box or bushing G, constructed with a cup-shaped recess on its inner end, of the axle provided with a flange, B, having a projection, $b$, and a washer, E, interposed between the outer face of the flange and the inner end of the axle box or bushing, substantially as set forth.

2. In a vehicle-axle, the combination, with the axle provided with the flange C and the flange B, having a projection, $b$, said flange B being of greater diameter than the flange C, of a bushing provided with a cup-shaped recess on its inner end and washers interposed between the flanges and the bushing, substantially as set forth.

In testimony whereof I have signed my name to this specification in the presence of two subscribing witnesses.

JACOB KRITCH.

Witnesses:
JNO. CROWELL, Jr.,
EMMA C. WRIGHT.